US008235278B2

(12) United States Patent
Fujimura et al.

(10) Patent No.: US 8,235,278 B2
(45) Date of Patent: Aug. 7, 2012

(54) PRESS METHOD AND PRESS APPARATUS

(75) Inventors: Shirou Fujimura, Miyoshi (JP); Takuma Watanabe, Anjo (JP); Hajime Banno, Tokai (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 0 days.

(21) Appl. No.: 12/898,115

(22) Filed: Oct. 5, 2010

(65) Prior Publication Data

US 2011/0095072 A1    Apr. 28, 2011

(30) Foreign Application Priority Data

Oct. 26, 2009   (JP) ................................ 2009-245431

(51) Int. Cl.
*B23K 20/02* (2006.01)
(52) U.S. Cl. ...................... 228/115; 228/135; 228/235.1
(58) Field of Classification Search .................... None
See application file for complete search history.

(56) References Cited

U.S. PATENT DOCUMENTS

| | | | | |
|---|---|---|---|---|
| 5,184,769 A * | 2/1993 | Moracz et al. | ................. | 228/121 |
| 5,255,425 A * | 10/1993 | Kanno | ............................. | 29/596 |
| 5,427,304 A * | 6/1995 | Woods et al. | ................. | 228/190 |
| 5,485,950 A * | 1/1996 | Shibata et al. | ................ | 228/194 |
| 6,162,114 A * | 12/2000 | Kobayashi et al. | ............. | 451/41 |
| 6,301,773 B1 * | 10/2001 | Chemburkar | ................... | 29/596 |
| 7,798,388 B2 * | 9/2010 | Crockett et al. | ............. | 228/193 |
| 2001/0023162 A1 * | 9/2001 | Kobayashi et al. | ............... | 451/5 |
| 2003/0155407 A1 * | 8/2003 | Yajima | ........................... | 228/193 |
| 2004/0188500 A1 * | 9/2004 | Jacksen et al. | ................ | 228/194 |
| 2005/0040727 A1 * | 2/2005 | Edwards et al. | .............. | 310/217 |
| 2005/0077798 A1 * | 4/2005 | Mitsui | ........................... | 310/217 |
| 2005/0098614 A1 * | 5/2005 | Jacksen et al. | ................ | 228/194 |
| 2006/0179644 A1 * | 8/2006 | Maruyama et al. | ............ | 29/732 |
| 2008/0085420 A1 * | 4/2008 | Matsuo et al. | ............. | 428/474.7 |
| 2008/0174200 A1 * | 7/2008 | Okamoto et al. | ............. | 310/217 |
| 2008/0230590 A1 * | 9/2008 | Takahashi et al. | ............ | 228/194 |
| 2009/0061211 A1 * | 3/2009 | Chan et al. | ..................... | 428/329 |
| 2009/0195110 A1 * | 8/2009 | Miyake et al. | ......... | 310/216.058 |
| 2009/0214890 A1 * | 8/2009 | Lowney et al. | ............... | 428/650 |
| 2010/0055491 A1 * | 3/2010 | Vecchio et al. | ............... | 428/603 |
| 2011/0179633 A1 * | 7/2011 | Amano et al. | .................. | 29/598 |

FOREIGN PATENT DOCUMENTS

| | | | |
|---|---|---|---|
| JP | 02-193552 A | * | 7/1990 |
| JP | 2000-041350 A | * | 2/2000 |
| JP | 2000-116080 A | * | 4/2000 |
| JP | 2001-286107 | | 10/2001 |
| JP | 2004-274902 A | * | 9/2004 |
| JP | 2005-295744 A | * | 10/2005 |
| JP | 2006-115659 A | * | 4/2006 |
| JP | 2009-268322 A | * | 11/2009 |

* cited by examiner

*Primary Examiner* — Kiley Stoner
(74) *Attorney, Agent, or Firm* — Greenblum & Bernstein, P.L.C.

(57) ABSTRACT

A press apparatus includes a mounting table and a pressing member. A workpiece formed of a plurality of laminated core sheets is placed on the mounting table, and the pressing member is used for pressing the workpiece on the mounting table from above. The mounting table is supported by a base member so as to be loosely movable in a horizontal plane. When the pressing member is lowered, a positioning member determines the position of the workpiece such that the core sheets of the workpiece are aligned along a single vertical axis.

2 Claims, 9 Drawing Sheets

PRESS METHOD AND PRESS APPARATUS

BACKGROUND OF THE INVENTION

The present invention relates to a press method and press apparatus for pressing a workpiece formed of a plurality of laminated plates such as core sheets along the lamination direction, thereby joining the plates in a laminated state. For example, the present invention relates to a press method and a press apparatus for a stator core and rotor core used in motors.

For example, Japanese Laid-Open Patent Publication No. 2001-286107 discloses a prior art apparatus for manufacturing a laminated iron core for a motor. This apparatus does not directly press a laminated iron core. According to this apparatus, a laminated iron core is placed on a bench, and rivets are inserted into through holes formed in the laminated iron core. Each rivet is swaged by a pressing pin. Accordingly, the laminated iron core is swaged by rivets. In other words, the laminated iron core is indirectly pressed via the rivets. At the swaging, an inner shaft is inserted into a central hole of the laminated iron core, and an outer holding ring is fitted about the outer circumferential surface of the laminated iron core. The inner shaft and the outer holding ring reduce radial displacements of the core sheets.

According to the apparatus of the above publication, a laminated iron core is placed on the bench with rivets inserted in the holes in advance. Therefore, radial movement of each core sheet is restricted by the rivets, which prevents the core sheets from being displaced. However, when no rivets are attached to the laminated iron core, there can be problems. In such a case, a laminated iron core formed simply by laminating core sheets is placed on the bench without inserting rivets. When this laminated iron core is subjected to a working operation such as pressing, displacement of the core sheets, if any, will possibly be irreparable. That is, when the laminated iron core is subjected to some sort of working operation, the laminated iron core on the bench is in a fixed position even if the positions of the inner and outer circumferential surfaces of the laminated iron core are restricted as in the apparatus of the above publication. Thus, the laminated iron core cannot be moved, and the core sheets cannot be easily moved to proper positions. Accordingly, it is difficult to produce a high-precision laminated iron core with uniform magnetic flux density.

SUMMARY OF THE INVENTION

Accordingly, it is an objective of the present invention to provide a press method and press apparatus capable of highly accurately joining a plurality of laminated plates such as core sheets when pressing the sheets along the lamination direction.

To achieve the foregoing objective and in accordance with a first aspect of the present invention, a press method for pressing a workpiece formed of plurality of laminated plates along a lamination direction, while determining positions of the plates, is provided. The method includes: placing the workpiece on a mounting table while allowing the workpiece to be loosely movable in a horizontal plane; and pressing the workpiece on the mounting table along the lamination direction.

In accordance with a second aspect of the present invention, a press apparatus for pressing a workpiece formed of plurality of laminated plates along a lamination direction is provided. The apparatus includes a mounting table on which the workpiece is placed, a pressing portion for pressing the workpiece on the mounting table from above, a base portion, and a positioning portion. The base portion supports the mounting table such that the mounting table is allowed to be loosely movable in a horizontal plane. The positioning portion determines the position of the workpiece such that the core sheets are aligned on a single vertical axis.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 10($a$) is a cross-sectional view of a normal laminated state of the laminated iron core of FIG. 8; and FIG. 10($b$) is a cross-sectional view of an abnormal laminated state of the laminated iron core of FIG. 8.

DETAILED DESCRIPTION OF THE PREFERRED EMBODIMENTS

A press apparatus and press method according to one embodiment of the present invention will now be described with reference to the drawings.

Figure 1:
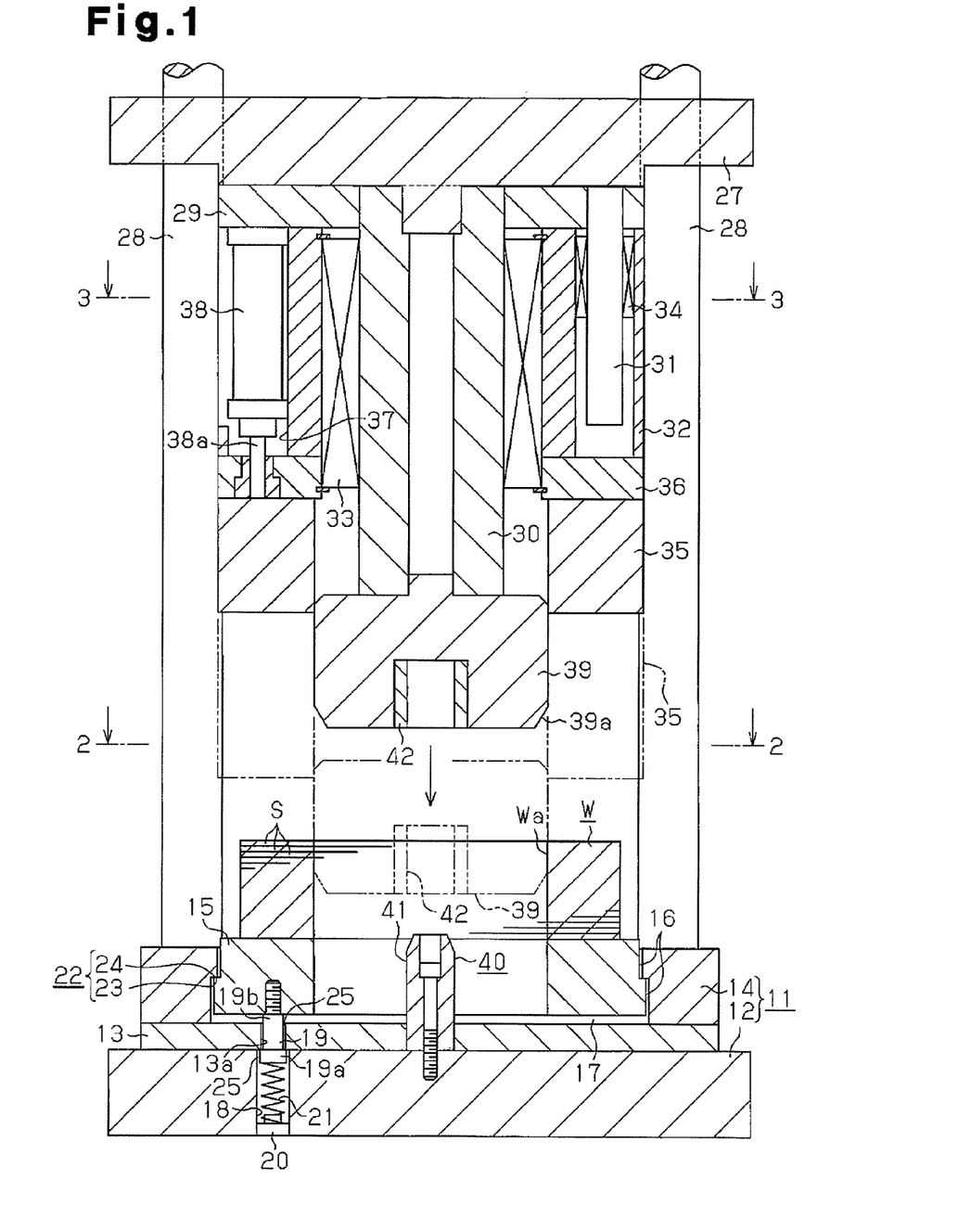
FIG. 1 is a cross-sectional view illustrating a press apparatus according to one embodiment of the present invention.

As shown in FIG. 1, the press apparatus includes a base member 11 serving as a base portion at the bottom. The base member 11 is formed by a rectangular plate-shaped base 12, which is placed on an installation area (not shown) such as a floor, and an annular support ring 14, which is fixed to the base 12 with a disc-like interposed plate 13. On the base 12 of the base member 11, a mounting table 15 is supported in the support ring 14 to be loosely movable in the horizontal and vertical directions. That is, an annular clearance 16 is defined between the outer circumferential surface of the mounting table 15 and the inner circumferential surface of the support ring 14. The clearance 16 allows the mounting table 15 to be loosely movable in any horizontal direction within 360 degrees. Also, a clearance 17 is defined between the lower surface of the mounting table 15 and the upper surface of the interposed plate 13. The clearance 17 allows the mounting table 15 to be loosely movable along the vertical direction.

Figure 8:
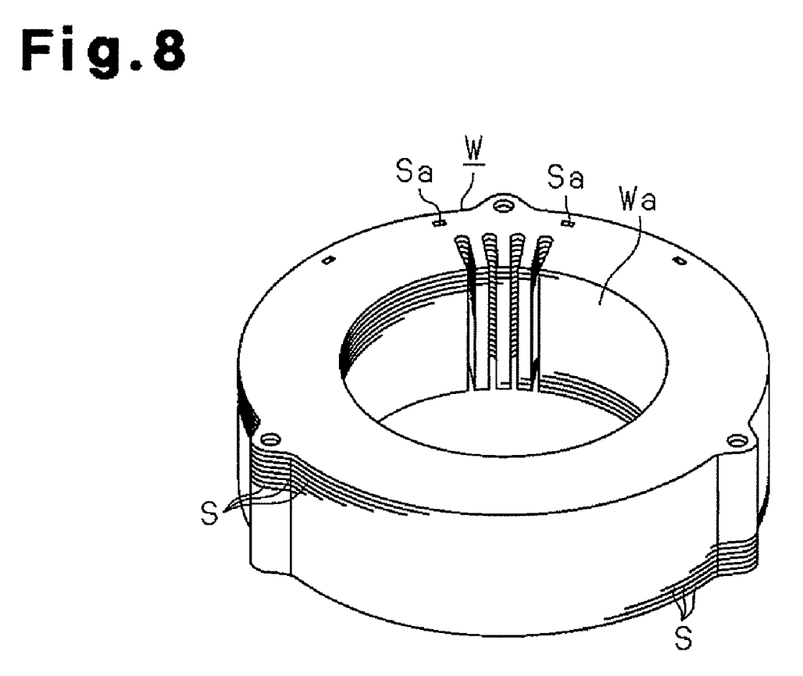
FIG. 8 is a perspective view illustrating a laminated iron core for a motor as a workpiece.
Figure 9:
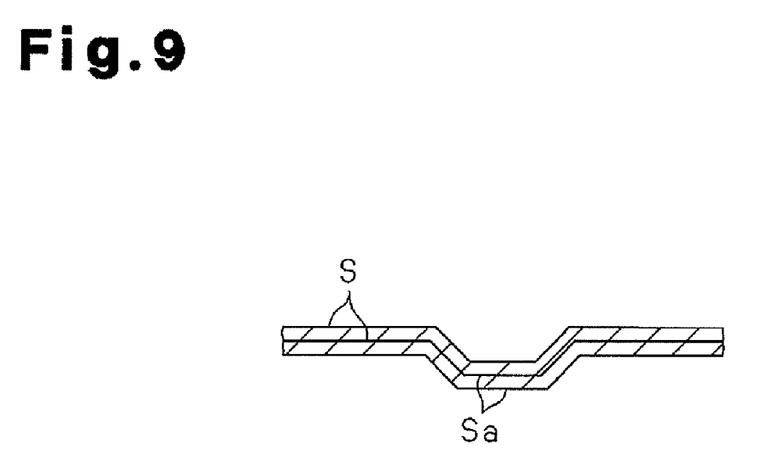
FIG. 9 is an enlarged cross-sectional view showing laminated and joined part of core sheets as plates in the laminated iron core of FIG. 8.

A workpiece W, which is a laminated iron core for a motor, is placed on the mounting table 15. As shown in FIG. 8, the workpiece W is formed by laminating core sheets S, which have been punched into a predetermined shape. A central hole Wa is formed in the center of the workpiece W. As shown in FIGS. 8 and 9, a plurality of joint portions Sa are formed in each core sheet S of the workpiece W at predetermined intervals along a common circle. With the core sheets S laminated, each adjacent pair of the core pieces S are engaged with each other via projections and recesses defined by the joint portions Sa, so that the core sheets S are joined in a laminated state.

Figure 2:
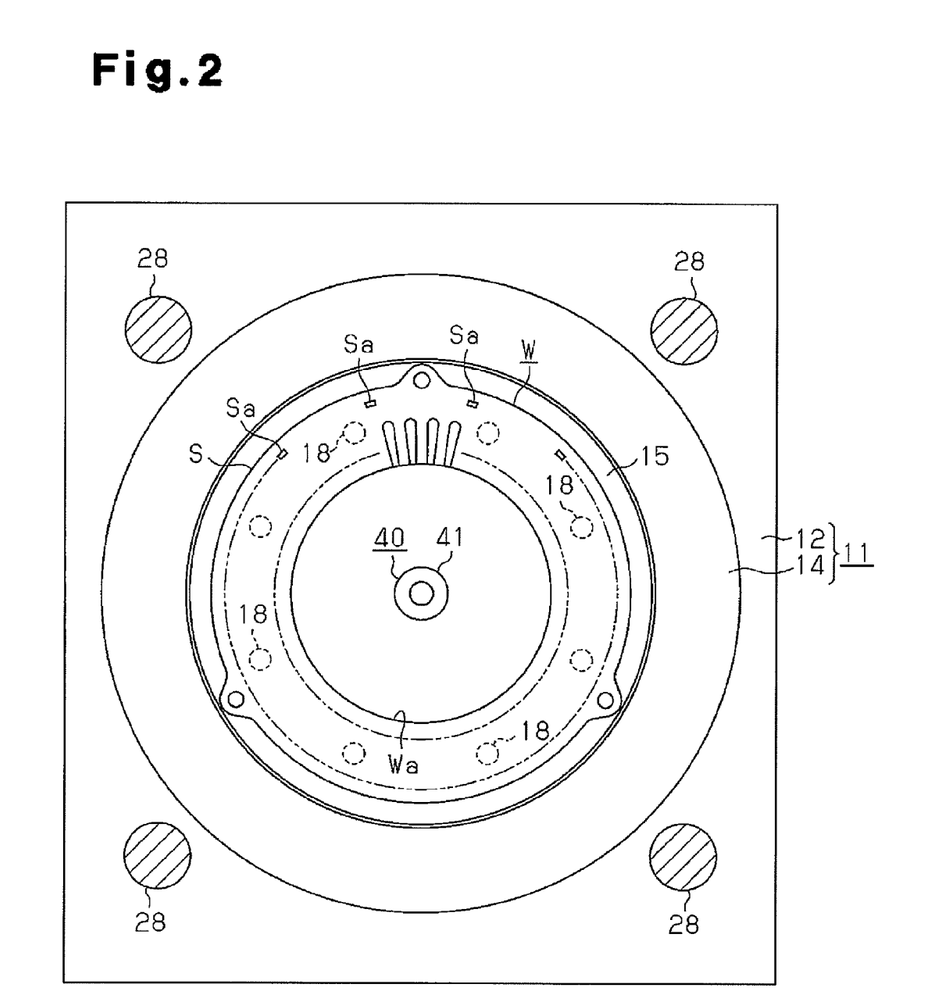
FIG. 2 is a cross-sectional view taken along line 2-2 of FIG. 1.

As shown in FIGS. 1 and 2, eight receiving holes 18, which extend vertically, are formed in the base 12 of the base member 11. The receiving holes 18 are arranged on a common circle at equal intervals. The interposed plate 13 has holes 13a corresponding to the receiving holes 18. A shoulder screw 19 is placed in each receiving hole 18. Each shoulder screw 19 extends through the corresponding hole 13a and threaded to the lower surface of the mounting table 15. Each shoulder screw 19 has a head 19a. A clearance 25 is defined between the outer circumferential surface of the head 19a of the shoulder screw 19 and the inner circumferential surface of the receiving hole 18, and between the outer circumferential surface of the step 19b of the shoulder screw 19 and the hole 13a. Each clearance 25 has the same width as the clearance 16. A spring seat 20 is provided at the bottom of each receiving hole 18. A spring 21 is located between the spring seat 20 and the head 19a of the corresponding shoulder screw 19. The springs 21 serve as urging portions that urge the mounting table 15 upward via the shoulder screws 19. In this case, the total urging force of all the springs 21 is set to be greater than the load resulting from the total weight of the mounting table 15 and the workpiece W placed on the mounting table 15.

As shown in FIG. 1, a restricting portion 22 is located between the support ring 14 of the base member 11 and the mounting table 15. The restricting portion 22 defines the upper limit position of the mounting table 15. The restricting portion 22 is formed by a downward step 23 formed on the inner circumferential surface of the support ring 14 and an upward step 24 formed on the outer circumferential surface of the mounting table 15. When the steps 23, 24 of the restricting portion 22 engage with each other, the mounting table 15 is held at the upper limit position by the urging force of the springs 21. In this state, the clearance 17 is defined between the lower surface of the mounting table 15 and the upper surface of the base 12 interposed plate 13.

Figure 3:
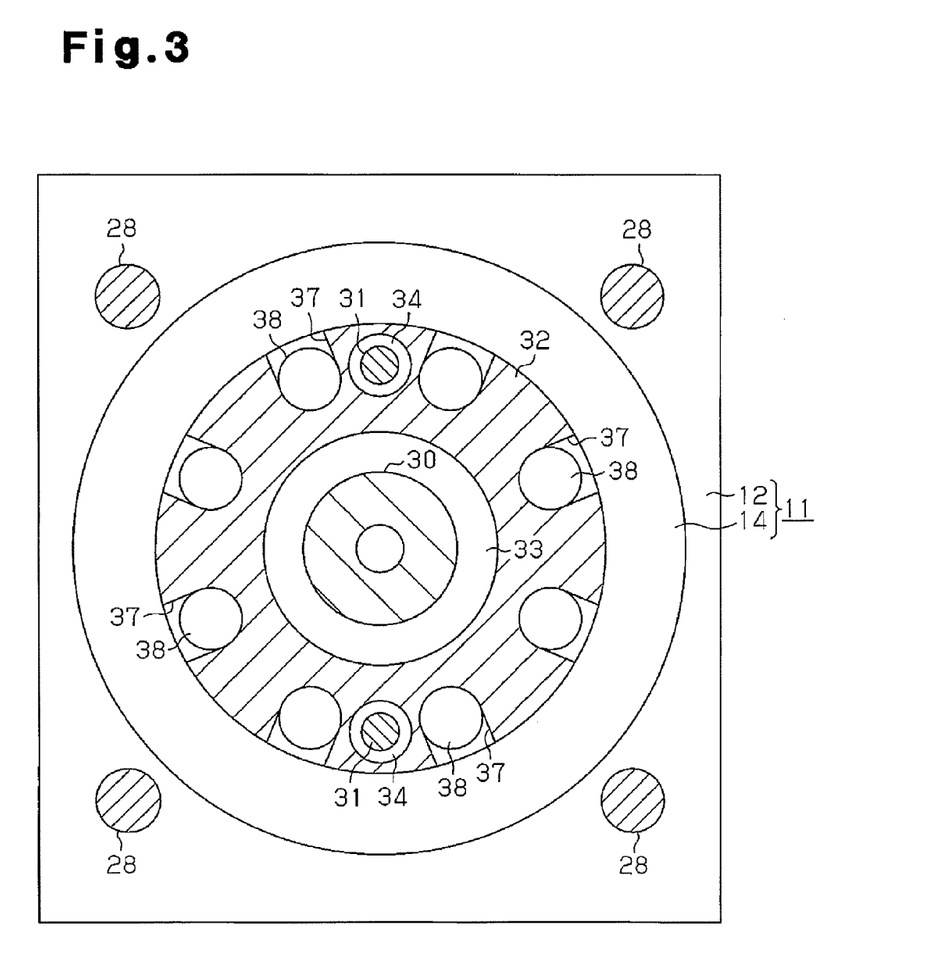
FIG. 3 is a cross-sectional view taken along line 3-3 of FIG. 1.

As shown in FIGS. 1 and 2, a lifting plate 27 is arranged on the base 12 of the base member 11. The lifting plate 27 is selectively lifted and lowered via guide rods 28, the number of which is four in the present embodiment. A disc-shaped attachment plate 29 is fixed to the lower surface of the lifting plate 27. A cylindrical main support rod 30 having a large diameter is fixed to the center of the lower surface of the attachment plate 29 to extend downward. Also, a pair of solid auxiliary support rods 31 having small diameter are provided in the periphery of the lower surface of the attachment plate 29, while being spaced by 180 degrees. The auxiliary support rods 31 extend downward (see FIG. 3). The main support rod 30 and the auxiliary support rods 31 support a lifting block 32 via sliding bearings 33, 34 so that the lifting block 32 can be lifted and lowered.

An annular pressing member 35 serving as a pressing portion is attached to the lower surface of the lifting block 32 with an interposed plate 36. The pressing member 35 is used to press the workpiece W on the mounting table 15 from above. Eight vertically extending receiving grooves 37 are formed in the outer circumferential surface of the lifting block 32. The receiving grooves 37 are spaced at equal angular intervals (see FIG. 3). A pressing cylinder 38, which extends downward, is received in each of the receiving grooves 37. The pressing cylinders 38 are fixed to the lower surface of the attachment plate 29. Each pressing cylinder 38 has a piston rod 38a, the distal end of which is coupled to the pressing member 35. The piston rods 38a of the pressing cylinders 38 are simultaneously retracted or projected, so that the pressing member 35 is lifted or lowered between an upper non-pressing position shown in FIG. 1 and a lower pressing position shown in FIG. 5.

Figure 4:
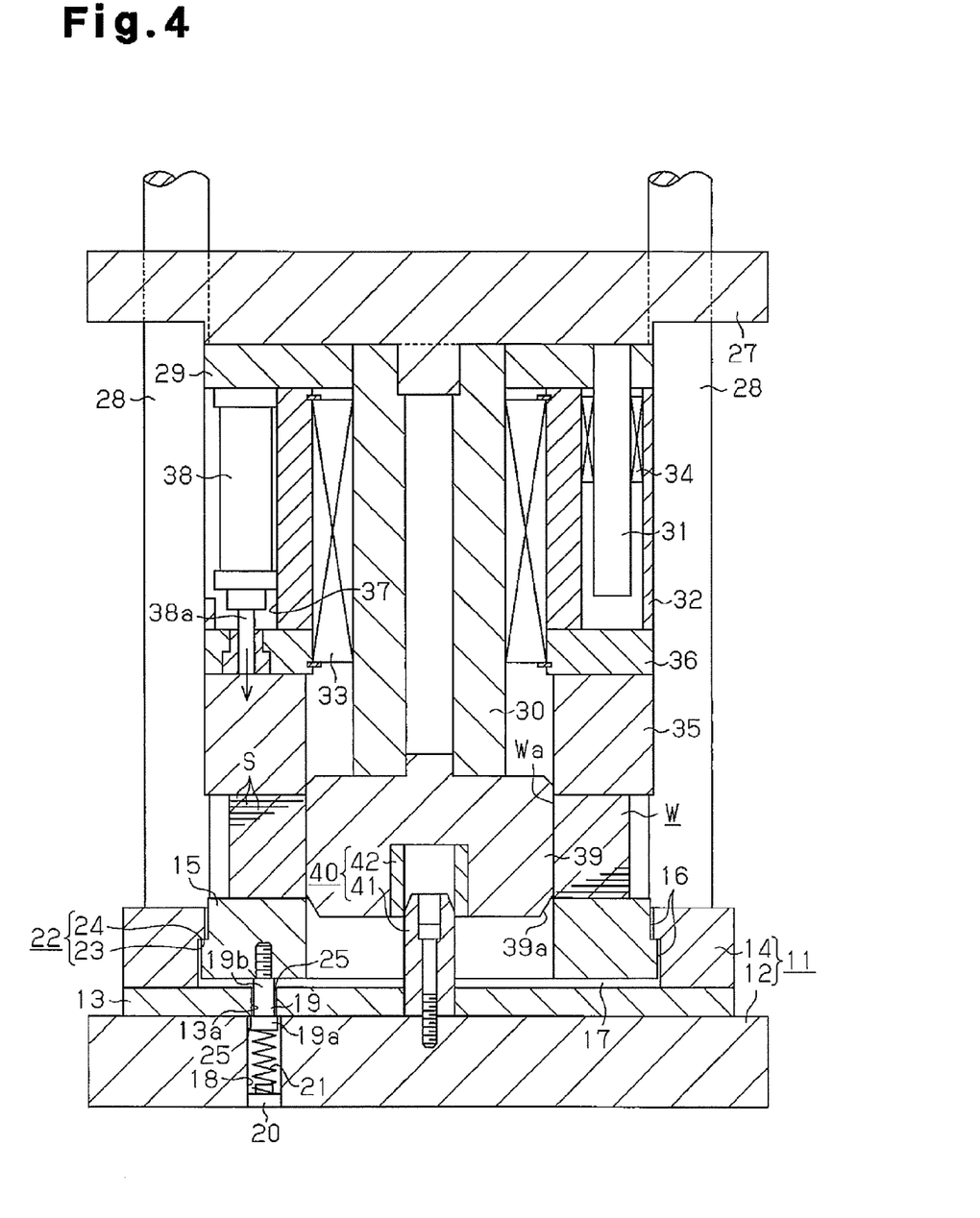
FIG. 4 is a cross-sectional view illustrating an operative state of the press apparatus shown in FIG. 1.

A positioning member 39 is fixed to the lower end of the main support rod 30. The positioning member 39 serves as a positioning portion that determines the position of the workpiece W on the mounting table 15. The positioning member 39 has a short columnar shape having a diameter slightly less than the inner diameter of the central hole Wa of the workpiece W. A tapered surface 39a is formed at the lower and outer circumference of the positioning member 39. The tapered surface 39a facilitates entry of the positioning member 39 into the central hole Wa. As shown in FIG. 4, when the pressing member 35 is lowered as the lifting plate 27 is lowered, the positioning member 39 enters the central hole Wa of the workpiece W on the mounting table 15 and contacts the inner circumferential surface of the central hole Wa. Accordingly, the position of the workpiece W is determined such that the core sheets S of the workpiece W are positioned along a single vertical axis.

An adjusting member 40 serving as an adjusting portion is provided between the base member 11 and the positioning member 39. The adjusting member 40 adjusts the position of the positioning member 39 when the pressing member 35 is lowered. The adjusting member 40 is formed by the adjuster pin 41 and an engaging ring 42. The adjuster pin 41 is provided to project from the center of the upper surface of the base 12 of the base member 11. The engaging ring 42 is embedded in the center of the lower surface of the positioning member 39 so as to be engageable with the adjuster pin 41. As shown in FIG. 4, when the pressing member 35 is lowered as the lifting plate 27 is lowered, the engaging ring 42 is engaged with the adjuster pin 41, so that the positioning member 39 is located on a predetermined vertical axis. Accordingly, the position of the positioning member 39 is adjusted.

Operation of the press apparatus will now be described.

In the state of FIG. 1, the lifting plate 27 is held at an upper position away from the mounting table 15 by a lifting cylinder (not shown). With the piston rods 38a of the pressing cylinders 38 located at the retracted positions, the pressing member 35 is arranged at the upper position. In this state, a laminated iron core for a motor formed of a number of laminated core sheets S, that is, the workpiece W is placed on the mounting table 15. In this case, the mounting table 15 is not lowered against the urging force of the springs 21, but is held at the upper limit position defined by the restricting portion 22, while being loosely movable.

Subsequently, when the lifting plate 27 is lowered toward the mounting table 15 by the lifting cylinder (not shown), the positioning member 39 enters the central hole Wa of the workpiece W to engage with the workpiece W as shown by an alternate long and two short dashes line in FIG. 1, so that the positioning of the workpiece W is started. Subsequently, as shown in FIG. 4, the engaging ring 42 of the positioning member 39 is engaged with the adjuster pin 41, so that the position of the positioning member 39 is adjusted to a position on the predetermined vertical axis. Accordingly, the center of the core sheets S is positioned on the predetermined vertical axis defined by the adjuster pin 41, so that the core sheets S of the workpiece W are aligned on the vertical axis. That is, the centers of the core sheets S are aligned along a single vertical axis.

In this state, the mounting table 15 is held to be loosely movable in the horizontal and vertical direction, in the support ring 14 of the base member 11. Therefore, when the positioning member 39 is determining the position of the workpiece W, the mounting table 15 is allowed to move vertically as well as laterally in a horizontal plane. This prevents the mounting table 15 and the workpiece W from moving relative to each other, so that the workpiece W follows movement of the positioning member 39. This allows the positioning of the workpiece W to be smoothly executed. As a result, the core sheets S of the workpiece W are accurately aligned along the single vertical axis.

Thereafter, the pressing cylinders 38 are synchronously activated to protrude, so that the pressing member 35 is moved from the upper non-pressing position to the lower pressing position to press the workpiece W on the mounting table 15 from above. When the pressing is executed, the pressing cylinders 38 do not necessarily need to be activated. That is, the lifting plate 27 may be lowered further to move the pressing member 35 to the pressing position. Then, the mounting table 15 is lowered from the upper limit position against the urging force of the springs 21, so that the clearance 17 between the lower surface of the mounting table 15 and the upper surface of the interposed plate 13 is eliminated, and the lower surface of the mounting table 15 contacts the upper surface of the interposed plate 13. In this state, the pressing force of the pressing member 35 presses the workpiece W between the mounting table 15 and the pressing member 35. This firmly joins the laminated core sheets S of the workpiece W together.

Figure 10A:
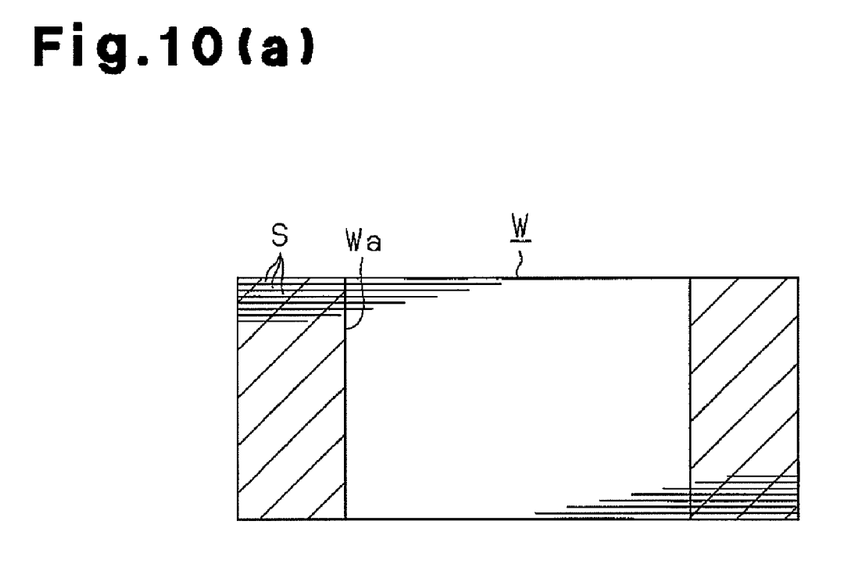
Figure 10B:
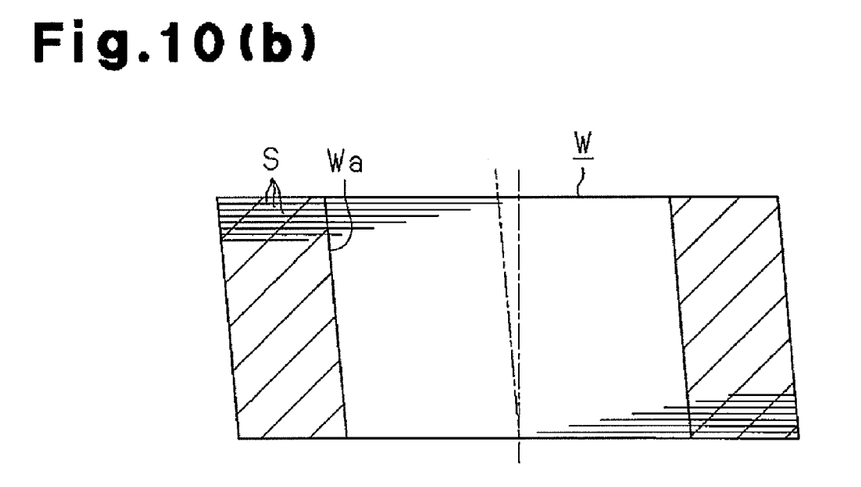

Therefore, even if the laminated core sheets S are not aligned before being pressed as shown in FIG. 10(b), the laminated core sheets S are aligned as shown in FIG. 10(a) by the positioning member 39 used for adjusting positions. The laminated core sheets S are pressed in this state, so that a high-precision laminated iron core is obtained.

Figure 5:
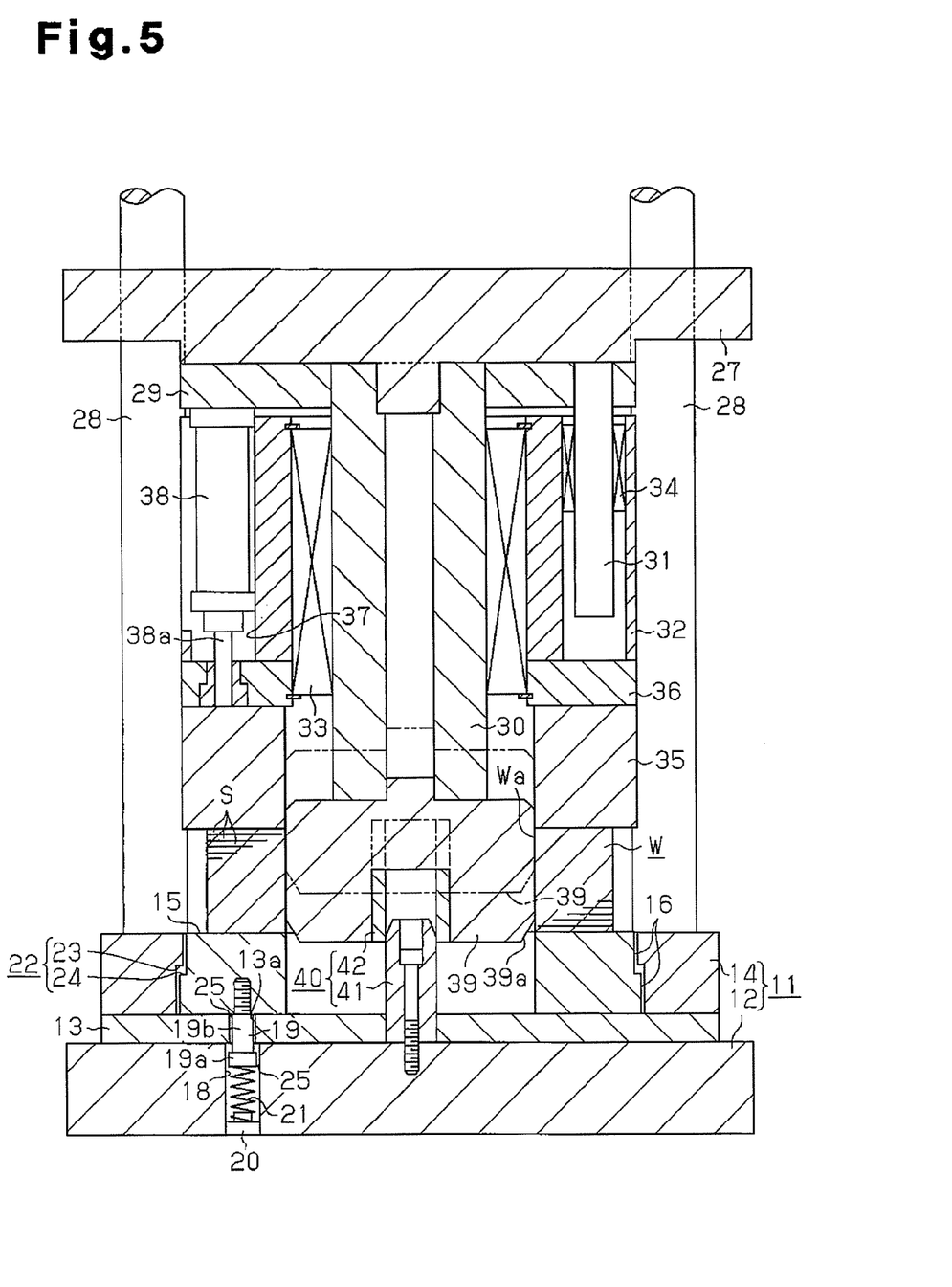
FIG. 5 is a cross-sectional view illustrating an operative state subsequent to FIG. 4 of the press apparatus.
Figure 6:
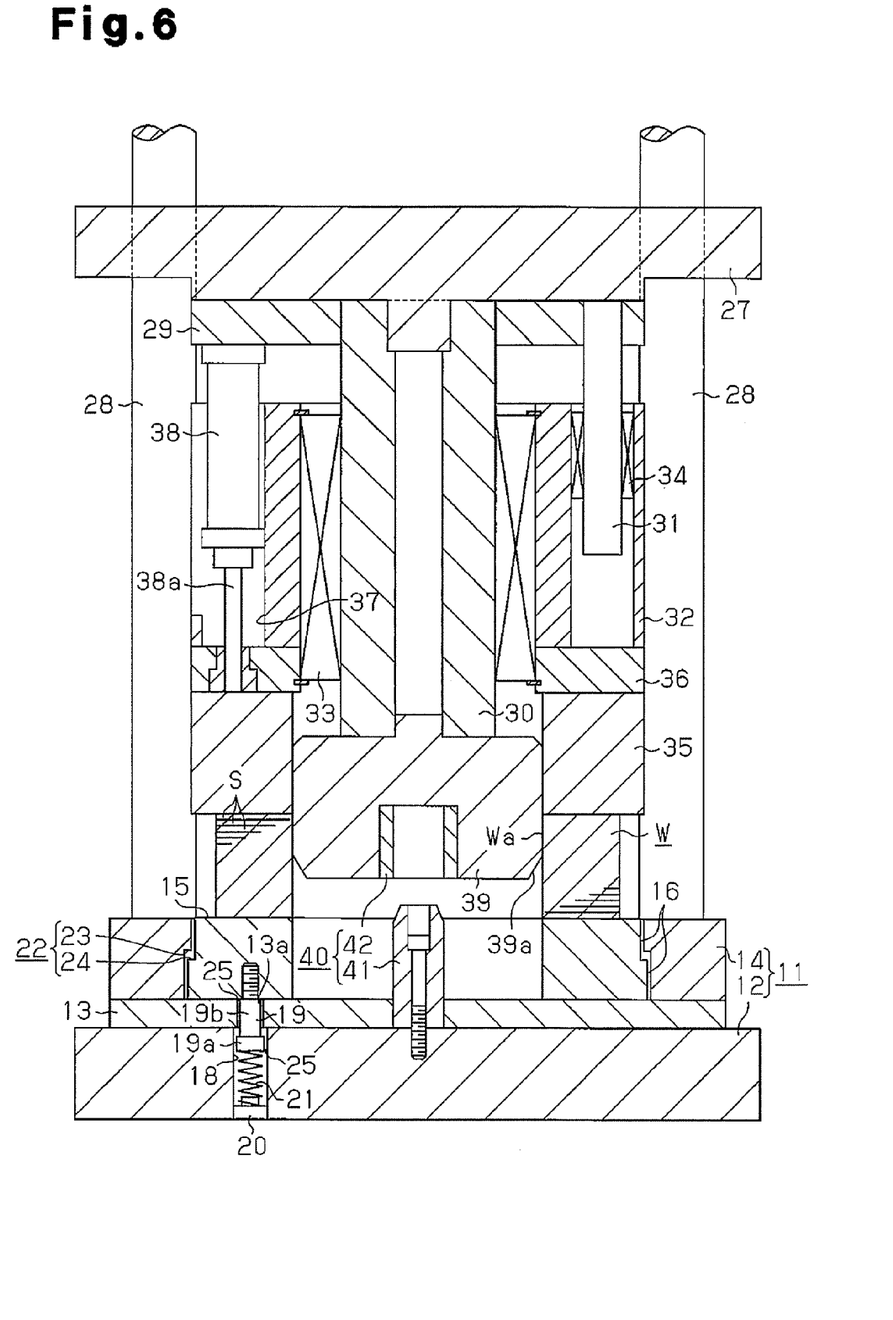
FIG. 6 is a cross-sectional view illustrating an operative state subsequent to FIG. 5 of the press apparatus.
Figure 7:
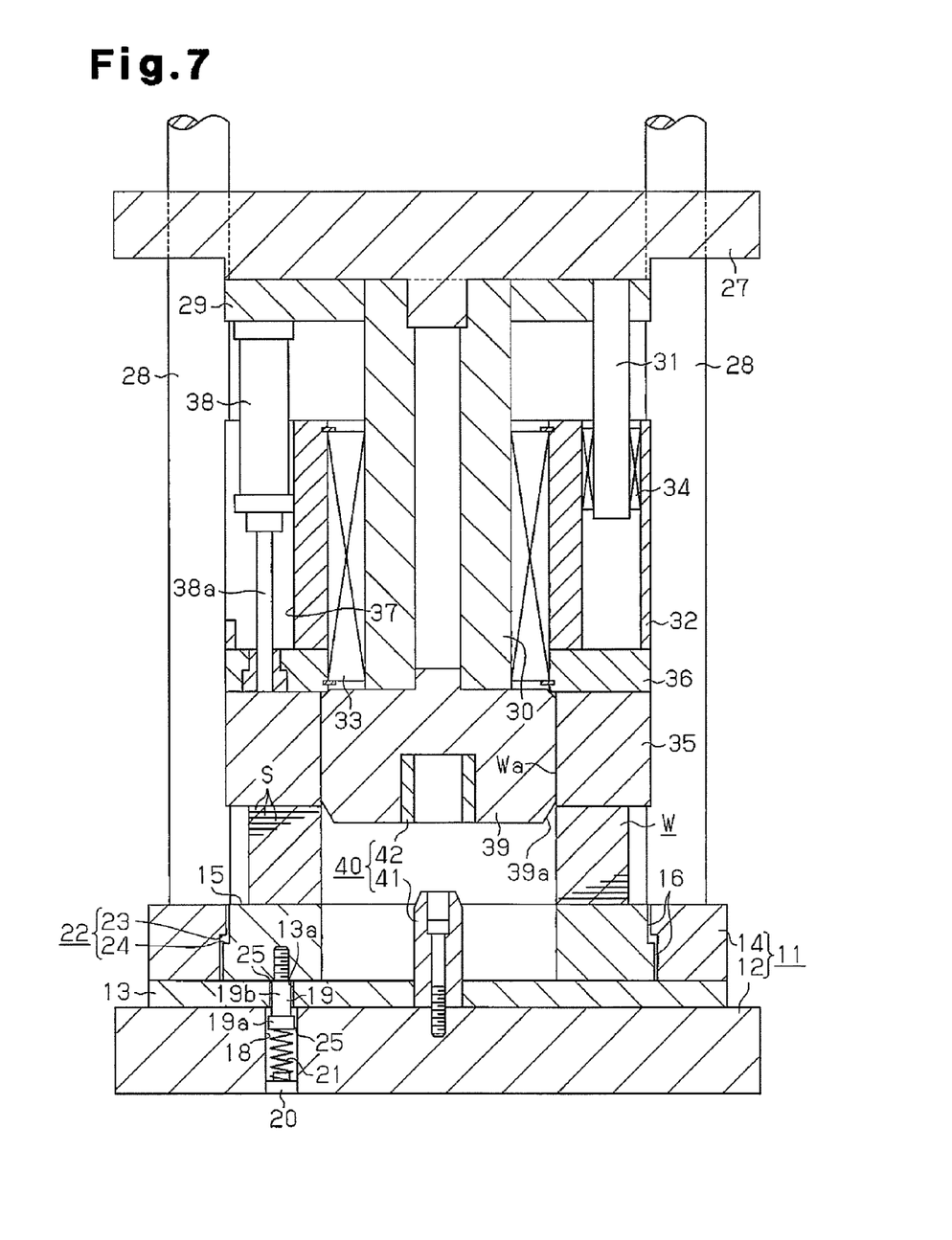
FIG. 7 is a cross-sectional view illustrating an operative state subsequent to FIG. 6 of the press apparatus.

After the pressing of the workpiece W is finished, the lifting plate 27 is lifted as shown by the line formed of alternate long and two short dashes in FIG. 5 and as illustrated in FIG. 6. Accordingly, the positioning member 39 starts being lifted toward the initial position. In this state, downward pressing force continues acting on the pressing cylinders 38. Therefore, as the lifting plate 27 is lifted, the piston rods 38a are extended, so that the pressing member 35 continues to press the workpiece W. The pressing of the workpiece W by the pressing member 35 continues until the positioning member 39 exits the central hole Wa of the workpiece W as shown in FIG. 7. Thereafter, when the lifting plate 27 continues to be lifted until the positioning member 39 is removed from the central hole Wa of the workpiece W, the pressing direction of the pressing cylinders 38 is reversed to move the pressing member 35 from the lower pressing position to the upper non-pressing position. Accordingly, the workpiece W on the mounting table 15 stops being pressed. Thus, the mounting table 15 is lifted to the upper limit position shown in FIG. 1, or the initial position, by the urging force of the springs 21. In this manner, the upper surface of the workpiece W of the mounting table 15 is released. The workpiece W, which has been pressed, can now be removed from the mounting table 15.

This embodiment therefore has the following advantages.

(1) The descent of the pressing member 35 presses the workpiece W on the mounting table 15 along the lamination direction of the core sheets S. Prior to the pressing, the position of the workpiece W is determined by the positioning member 39 while the mounting table 15 is allowed to be loosely movable in the horizontal plane. This aligns the core sheets S of the workpiece W along a single vertical axis. That is, the centers of the core sheets S are aligned along a single vertical axis. Therefore, the core sheets S are highly accurately joined together without any clearances or displacements between the core sheets S.

(2) The base member 11 allows the mounting table 15 to be loosely movable also in the vertical direction. Further, the mounting table 15 is urged upward by the springs 21 and held at the upper limit position by the restricting portion 22. Thus, when the descent of the pressing member 35 presses the workpiece W on the mounting table 15 along the direction of lamination of the core sheets S, the mounting table 15 is allowed to be loosely movable not only in the horizontal plane, but also in the vertical direction. Accordingly, the core sheets S of the workpiece W can be smoothly moved to desired positions in accordance with the position of the positioning member 39, allowing high-precision working. Further, when the descent of the pressing member 35 presses the workpiece W on the mounting table 15 along the direction of lamination of the core sheets S, the springs 21 suppresses the occurrence of impacts. This contributes to a further high-precision operation.

(3) When the pressing member 35 is lowered, the position of the positioning member 39 is adjusted by the adjusting member 40 such that the positioning member 39 is located on a predetermined vertical axis. Thus, when the pressing member 35 is lowered, the adjusting member 40 adjusts the position of the positioning member 39 to a position on the predetermined vertical axis, prior to the positioning of the workpiece W by the positioning member 39. Accordingly, the positioning member 39 accurately aligns the core sheets S of the workpiece W on the predetermined single vertical axis. This allows the workpiece W and the pressing member 35 to be arranged on the same axis, and the workpiece W receives even pressing force along the entire circumference. Therefore, a high-precision laminated iron core is obtained that has no clearances or displacements between the core sheets S.

(4) At the end of pressing of the workpiece W, the pressing member 35 continues pressing the workpiece W until the positioning member 39 is lifted to the initial position and is removed from the central hole Wa of the workpiece W. Therefore, the edges of the core sheets S of the workpiece W that face the central hole Wa are prevented from being rolled up by the ascent of the positioning member 39. This ensures accuracy.

Modified Embodiment

The above illustrated embodiment may be modified as follows.

A clearance 17 between the mounting table 15 and the interposed plate 13 may be omitted. In this case, the lower surface of the mounting table 15 is preferably supported by spherical bodies that are loosely rotatable, so that the mounting table 15 can be smoothly moved in horizontal directions.

The adjusting member 40, which is formed by the adjuster pin 41 and the engaging ring 42, may be omitted.

Therefore, the present examples and embodiments are to be considered as illustrative and not restrictive and the invention is not to be limited to the details given herein, but may be modified within the scope and equivalence of the appended claims.

The invention claimed is:

1. A press method for pressing a workpiece formed of a plurality of laminated plates along a lamination direction, while determining positions of the plates, the method comprising:

placing the workpiece on a mounting table that is movable in an horizontal direction and that allows the workpiece to be movable in a horizontal plane; and pressing the workpiece on the mounting table along the lamination direction, wherein the workpiece is a laminated iron core made of laminated core sheets, and wherein, after said pressing, the workpiece is fixed with the position of each core sheet determined relative to adjacent core sheets via engagement between projections and recesses.

2. A press method for pressing a workpiece formed of a plurality of laminated plates along a lamination direction, while determining positions of the plates, the method comprising:

placing the workpiece on a mounting table that is movable in an horizontal direction and that allows the workpiece to be movable in a horizontal plane; and pressing the workpiece on the mounting table along the lamination direction, wherein said pressing the workpiece comprises:

determining the position of the workpiece using a positioning member that is engaged with a central hole of the workpiece; and continuing to press the workpiece until the positioning member exits the central hole.

* * * * *

UNITED STATES PATENT AND TRADEMARK OFFICE
CERTIFICATE OF CORRECTION

| | |
|---|---|
| PATENT NO. | : 8,235,278 B2 |
| APPLICATION NO. | : 12/898115 |
| DATED | : August 7, 2012 |
| INVENTOR(S) | : S. Fujimura et al. |

Page 1 of 1

It is certified that error appears in the above-identified patent and that said Letters Patent is hereby corrected as shown below:

Column 7, Line 2, Claim 1, Line 6, "an" should be --any--.

Column 8, Line 2, Claim 2, Line 6, "an" should be --any--.

Signed and Sealed this
Fifth Day of February, 2013

Teresa Stanek Rea
*Acting Director of the United States Patent and Trademark Office*